United States Patent [19]

Schmiegel

[11] 3,872,065

[45] Mar. 18, 1975

[54] VULCANIZABLE FLUOROELASTOMER COMPOSITION

[75] Inventor: Walter Werner Schmiegel, Wilmington, Del.

[73] Assignee: E. I. du Pont de Nemours and Company, Wilmington, Del.

[22] Filed: Oct. 3, 1973

[21] Appl. No.: 403,325

[52] U.S. Cl..... 260/80.76, 260/31.2 R, 260/32.8 R, 260/33.2 R, 260/42.27, 260/80.77, 260/87.7
[51] Int. Cl.......................... C08f 27/00, C08f 37/00
[58] Field of Search.............. 260/80.77, 80.76, 87.7

[56] References Cited
UNITED STATES PATENTS

| | | | |
|---|---|---|---|
| 2,968,649 | 1/1961 | Pailthorp et al. | 260/80.5 |
| 3,051,677 | 8/1962 | Rexford | 260/29.6 |
| 3,235,537 | 2/1966 | Albin et al. | 260/80.5 |
| 3,331,823 | 7/1967 | Sianesi et al. | 260/87.7 |
| 3,335,106 | 8/1967 | Sianesi et al. | 260/29.6 |
| 3,655,727 | 4/1972 | Patel et al. | 260/47 UP |
| 3,686,143 | 8/1972 | Bowman | 260/47 UP |
| 3,712,877 | 1/1973 | Patel et al. | 260/87.7 |

*Primary Examiner*—Stanford M. Levin

[57] ABSTRACT

A vulcanizable fluoroelastomer composition having utility in the manufacture of cured fluoroelastomer articles can be prepared by blending the following components: (A) an elastomeric vinylidene fluoride copolymer, (B) as a vulcanization agent, a compound selected from certain 1,4-benzoquinones, and 1,4-naphthoquinones, (C) a suitable vulcanization accelerator such as a quaternary ammonium, phosphonium, stibonium or arsonium compound, and (D) a suitable metal compound such as a divalent metal oxide or hydroxide.

8 Claims, No Drawings

VULCANIZABLE FLUOROELASTOMER COMPOSITION

This invention relates to vulcanizable fluoroelastomer compositions in which the fluoroelastomer is an elastomeric copolymer of vinylidene fluoride and at least one other fluorine-containing monomer. The invention also relates to a process for curing (vulcanizing or cross-linking) vinylidene fluoride copolymer compositions, and to the cured product.

"Copolymer" herein means the product of copolymerizing two or more different monomers.

SUMMARY OF THE INVENTION

The present invention provides a vulcanizable fluoroelastomer composition which comprises
 (A) an elastomer copolymer of vinylidene fluoride and at least one other fluorine-containing monomer,
 (b) as a vulcanization agent for said copolymer, a quinone compound selected from the group: 1,4-benzoquinones of the formula

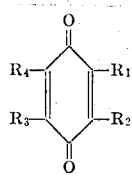

wherein $R_1$, $R_2$, $R_3$, and $R_4$ are selected individually from the group: H, alkyl, aryl, alkaryl and aralkyl, at least two of said R's being H, and 1,4-naththoquinones of the formula

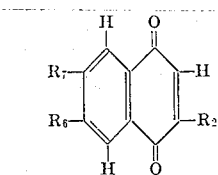

wherein $R_2$, $R_6$ and $R_7$ are selected individually from the group: H, alkyl and aralkyl,
 (c) as a vulcanization accelerator capable of accelerating the cure of component (A) in the presence of component (B), a quaternary ammonium, phosphonium, stibonium or arsonium compound, and
 (D) a divalent metal oxide or hydroxide.

The invention also provides a curing process wherein the novel composition defined above is heated until it is cured; and it provides the resulting cured composition.

DESCRIPTION OF PREFERRED EMBODIMENTS

In reference to the vinylidene fluoride copolymer, the "other fluorine-containing monomer" is usually an ethylenically unsaturated monomer containing at least one fluorine atom substitutent on each double-bonded carbon atom. The copolymer is preferably composed of at least one of the following:

copolymers of vinylidene fluoride and hexafluoropropylene or pentafluoropropylene; copolymers of vinylidene fluoride, tetrafluoroethylene and hexafluoropropylene or pentafluoropropylene; and copolymers of vinylidene fluoride, a perfluoroalkyl perfluorovinyl ether and hexafluoropropylene.

Copolymers of vinylidene fluoride and hexafluoropropylene are described in U.S. Pat. No. 3,051,677 issued to Rexford. Copolymers of vinylidene fluoride, tetrafluoroethylene and hexafluoropropylene are described in U.S. Pat. No. 2,968,649 issued to Pailthorp and Schroeder. Copolymers of vinylidene fluoride and pentafluoropropylene are described in U.S. Pat. No. 3,331,823 issued to Sianesi et al.; and copolymer of these two components with tetrafluoroethylene are described in U.S. Pat. No. 3,335,106 issued to Sianesi et al. Copolymers of vinylidene fluoride, a perfluoroalkyl perfluorovinyl ether (having 1–5 carbon atoms in the alkyl group) and hexafluoropropylene are described in U.S. Pat. No. 3,235,537 issued to Albin and Gallagher.

In the majority of applications, the curable composition used by the person who makes the cured articles preferably contains for each 100 parts by weight of component (A), about 0.2–7 parts by weight of component (B), about 0.1–10 parts by weight of component (C), and about 1–20 parts by weight of component (D). It is advisable to add at least enough of component (D) to neutralize the acid formed during the curing process. Particularly preferred are compositions wherein the component (B) cross-linking agent content is 0.5–5 parts by weight, the component (C) accelerator content is about 0.2–2 parts by weight, and the component (D) metal compound content is about 2–10 parts by weight (for each 100 parts by weight of the component (A) vinylidene fluoride copolymer).

In a preferred embodiment of the invention, the component (B) vulcanization agent is 1,4-benzoquinone. This is the compound in which each of the R components is hydrogen in the 1,4-benzoquinone formula shown above. Also very useful are the monomethyl, 2,5-dimethyl and monophenyl derivatives of 1,4-benzoquinone, as well as 1,4-naphthoquinone and the 2-methyl derivative thereof. Also useful are other derivatives of 1,4-benzoquinone and 1,4-naphthoquinone within the description given above in the Summary of the Invention, including for example, the paratolyl, benzyl and 2-phenylethyl derivatives of 1,4-benzoquinone.

In the portion of the description of component (B) which refers to various R components other than hydrogen, it will be understood that these R components are hydrocarbon groups; thus they contain only carbon and hydrogen. Any alkyl groups present are preferably lower alkyl groups, such as those having 1–8 carbon atoms. Phenyl is the preferred aryl group. In the benzoquinones, preferably only one of the two carbon atoms adjacent to each C=O of the nucleus has a hydrogen group attached to it. For example, if $R_2$ is a hydrocarbon group, $R_3$ is preferably hydrogen. Any alkyl group present in the benzoquinones which contains at least 4 carbon atoms preferably has each of the 2 carbon atoms nearest the nucleus bonded to at least 1 hydrogen atom. In the naphthoquinones, which $R_2$ is an alkyl group having at least 4 carbon atoms, preferably each of the two carbon atoms nearest the nucleus is bonded to at least 1 hydrogen atom.

Component (C) of the novel composition is a vulcanization accelerator capable of accelerating the cure of the component (A) copolymer in the presence of the component (B) vulcanization agent. Component (C) can be any one or more of the following types of compounds already known to be useful for accelerating the cure of fluoroelastomers:

methyltrioctylammonium chloride and other quaternary ammonium compounds such as those described by Patel et al, in U.S. Pat. No. 3,655,727 and by Pattison in French Patent 71-18215 (U.S. Pat. No. 2,091,806);

benzyltriphenyl phosphonium chloride or bromide and other quaternary phosphonium compounds such as those described by Patel et al in U.S. Pat. No. 3,712,877 and by Pattison in French Patent 71–20887 (U.S. Pat. No. 2,096,115).

Component (D) of the present composition is a divalent metal oxide or hydroxide or a blend of the oxide and hydroxide. One can also use one or more metal salts of weak acids along with component (D). Such metal compounds are further described by Bowman in U.S. Pat. No. 3,686,143.

Components B, C, and D can be mixed with the elastomeric copolymer by means of any mixing apparatus known to be useful for preparing rubber compositions; for example, a roller-type rubber mill or a Banbury mixer. Known fillers, pigments, pore-forming agents and other additives can also be blended with the composition.

One can also add a solvent for component A to form a liquid composition useful in the preparation of adhesive layers, coatings, films, and the like. Among the preferred solvents are acetone, methylethyl ketone, ethyl acetate, amyl acetate and tetrahydrofuran.

The initial curing of the curable composition is preferably carried out by heating the composition for about 2–60 minutes at about 120°–205°C.; conventional rubber-curing presses, molds, extruders, and the like provided with suitable heating and curing means can be used. Curing can be done at a lower temperature for a longer time (e.g. 100°C. for 15 hours) or at a higher temperature for a very short period of time (e.g. a few degrees above 205°C. for less than 1 minute). Also, if one wants a product having a maximum heat resistance and dimensional stability, it is preferred to carry out a post-curing operation wherein the article is heated in an oven or the like for an additional period of about 1–48 hours at about 204°–260°C. One skilled in the art will realize that the best curing time and temperature for a particular application will depend on such factors as the nature and proportion of ingredients and the properties needed in the final product.

The composition of this invention has utility for the manufacture of cured fluoroelastomer articles including those having desirable low compression set values. The composition is useful for the manufacture of heat-resistant and resilient O-ring seals, shaft seals, gaskets, tubing and the like.

The following examples illustrate the invention; all amounts are by weight unless otherwise indicated.

EXAMPLES 1–6

Six useful fluoroelastomer compositions of the present invention are prepared, cured and tested. Table I below shows the formula of each composition (parts by weight of each component) and test results on each after curing, and after curing plus heat aging; also Mooney Scorch values on the freshly-prepared uncured compositions, using ASTM Method D–1646–63.

TABLE I

| | Example | | | | | |
|---|---|---|---|---|---|---|
| | 1 | 2 | 3 | 4 | 5 | 6 |
| Formula: | | | | | | |
| Fluoroelastomer | 100 | 100 | 100 | 100 | 100 | 100 |
| Carbon black ("Thermax" MT) | 30 | 30 | 30 | 30 | 30 | 30 |
| Calcium hydroxide | 6 | 6 | 6 | 6 | 6 | 6 |
| Magnesium oxide | 3 | 3 | 3 | 3 | 3 | 3 |
| Accelerator: | | | | | | |
| 1 | 1 | | 1 | 1 | 1.5 | 1.5 |
| 2 | | 0.54 | | | | |
| Vulcanization agent: | | | | | | |
| 1 | 2.0 | 2.0 | | | | |
| 2 | | | 2.26 | | | |
| 3 | | | | 2.52 | | |
| 4 | | | | | 2.92 | |
| 5 | | | | | | 3.18 |
| Test results: | | | | | | |
| Cured samples: | | | | | | |
| Modulus, 100%, p.s.i. | 725 | 1,000 | 1,025 | 1,260 | 635 | 950 |
| Tensile strength, p.s.i. | 1,925 | 1,675 | 1,800 | 1,925 | 1,815 | 1,720 |
| Elongation at break, percent | 180 | 150 | 160 | 140 | 215 | 185 |
| Hardness | 73 | 75 | 75 | 75 | 74 | 82 |
| Compression set— O-rings, 70 hrs./232°C | 45 | 46 | 45 | 54 | 68 | 74 |
| Cured/heat-aged samples: | | | | | | |
| Modulus, 100%, p.s.i. | 715 | 1,025 | 925 | 1,275 | 630 | 1,385 |
| Tensile strength, p.s.i. | 1,300 | 1,175 | 1,300 | 1,500 | 1,710 | 1,655 |
| Elongation at break, percent | 200 | 120 | 140 | 120 | 254 | 124 |
| Hardness | 79 | 71 | 83 | 87 | 76 | 81 |
| Mooney Scorch: Minutes to— | | | | | | |
| 5-point rise | 26 | 24.5 | 23 | 5 | 6 | 6.5 |
| 10-point rise | >30 | >30 | 30 | 7 | >30 | 14.5 |

Referring to Table I, the fluoroelastomer is a vinylidene fluoride/hexafluoropropylene 60:40 copolymer whose Mooney Viscosity ML–10 at 100°C. is 60. Accelerator 1 is benzyltriphenylphosphonium chloride. Accelerator 2 is tetraphenylphosphonium chloride. Vulcanization agent 1 is 1,4-benzoquinone. Vulcanization agent 2 is methyl-1,4-benzoquinone. Vulcanization agent 3 is 2,5-dimethyl-1,4-benzoquinone. Vulcanization agent 4 is 1,4-naphthoquinone. Vulcanization agent 5 is 2-methyl-1,4-naphthoquinone.

The compositions of Table I are prepared by blending the ingredients on a two-roll mill whose rolls are at about 25°C.

In preparing the cured samples, the material is press-cured for 10 minutes at 177°C, except in Example 5 the press-cure time is 25 minutes. Press-curing is done at a total pressure of about 40,000 pounds. All of the cured samples are post-cured in an oven containing circulating air in which the temperature reaches 260°C. in 4 hours and remains at 260°C. for 24 hours. The cured and heat-aged samples are prepared by subjecting the resulting cured samples to a temperature of 276°C. for 70 hours in an oven containing circulating air. The modulus, tensile, and elongation values are obtained at room temperature by ASTM method D–412–66. The hardness values indicate Shore hardness (Durometer A) as tested by ASTM Method D–676. Compression set values obtained by ASTM Method D–395–61; the O-rings measure 1 inch by 0.139 inch.

The fluoroelastomer compositions of Table I are useful for the manufacture of heat-resistant and resilient O-rings, seals, gaskets, tubing and the like.

Useful results are also obtained when Example 1 is repeated except accelerator 1 is replaced with methyltrioctylammonium chloride in an amount sufficient to give the desired rate of cure.

1. A vulcanizable fluoroelastomer composition which comprises

A. an elastomeric copolymer of vinylidene fluoride and at least one other fluorine-containing monomer, B. as a vulcanization agent for said copolymer, a quinone compound selected from the group: 1,4-benzoquinones of the formula

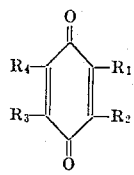

wherein $R_1$, $R_2$, $R_3$ and $R_4$ are selected individually from the group: H, alkyl, aryl, alkaryl and aralkyl, at least two of said R's being H, and 1,4-naphthoquinones of the formula

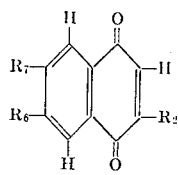

wherein $R_2$, $R_6$ and $R_7$ are selected individually from the group: H, alkyl and aralkyl,
C. as a vulcanization accelerator capable of accelerating the cure of component (A) in the presence of component (B), a quaternary ammonium, phosphonium, stibonium or arsonium compound, and
D. a divalent metal oxide or hydroxide; said composition containing for each 100 parts by weight of component (A), about 0.2-7 parts by weight of compound (B), about 0.1-10 parts by weight of component (C), and about 1-20 parts by weight of component (D).

2. A composition according to claim 1 wherein component (A) is a copolymer selected from the group: copolymers of vinylidene fluoride and hexafluoropropylene or pentafluoropropylene; copolymers of vinylidene fluoride, tetrafluoroethylene and hexafluoropropylene or pentafluoropropylene; and copolymers of vinylidene fluoride, a perfluoroalkyl perfluorovinyl ether and hexafluoropropylene.

3. A composition according to claim 2 wherein the compound (B) content is about 0.5-5 parts by weight, the component (C) content is about 0.2-2 parts by weight, and the component (D) content is about 2-10 parts by weight.

4. A composition according to claim 2 wherein component (B) is 1,4-benzoquinone.

5. A composition according to claim 2 wherein component (C) is the quaternary ammonium compound known as methyltrioctylammonium chloride.

6. A composition according to claim 2 wherein component (C) is benzyltriphenyl phosphonium chloride or bromide.

7. A process which comprises heating the composition defined in claim 1 until it is cured.

8. A cured composition made by heating the composition defined in claim 1.

* * * * *